United States Patent [19]
Andermo et al.

[11] 4,068,207
[45] * Jan. 10, 1978

[54] ACOUSTIC LOG

[75] Inventors: Nils Ingvar Andermo, Taby; Karl-Gustav Masreliez, Stockholm, both of Sweden

[73] Assignee: Jungner Instrument AB, Solna, Sweden

[*] Notice: The portion of the term of this patent subsequent to Nov. 9, 1993, has been disclaimed.

[21] Appl. No.: 685,068

[22] Filed: May 10, 1976

Related U.S. Application Data

[63] Continuation of Ser. No. 473,726, May 28, 1974.

[30] Foreign Application Priority Data

June 1, 1973 Sweden .................. 7307805

[51] Int. Cl.² .................. G01S 9/66
[52] U.S. Cl. .................. 340/3 R; 340/5 S; 343/8
[58] Field of Search .................. 340/5 S; 343/8

[56] References Cited

U.S. PATENT DOCUMENTS

| | | | |
|---|---|---|---|
| 3,066,279 | 11/1962 | Marks | 340/5.5 |
| 3,143,734 | 8/1964 | Raabe | 343/9 |
| 3,147,477 | 9/1964 | Dickey, Jr. | 343/8 |
| 3,991,398 | 11/1976 | Andermo et al. | 340/5.5 |

*Primary Examiner*—Richard A. Farley
*Attorney, Agent, or Firm*—Flynn & Frishauf

[57] ABSTRACT

Apparatus for measuring a vessel's velocity relative to a reference location includes a transmitter on board the vessel for transmitting a coherent signal toward a reference location from where the coherent signal is reflected, and a receiver on board the vessel which includes at least four spaced-apart receiver transducers. The coherent signal transmitted by the transmitter is within a lobe range that is substantially common to the receiver transducers, the signals reflected by the reference location comprising at least two acoustic signals that are similar in character but different in timing from each other, the difference in timing being a function of the distance in the direction of measurement between the spaced-apart receiver transducers and further being a function of the vessel's velocity, the received signals comprising reflections from every point on the reference location within the lobe range. Operating means is provided to operate on the reflected acoustic signals received by the receiver so as to generate a signal which is a function of the timing difference between the two signals and which is further indicative of the vessel's velocity relative to the reference location.

5 Claims, 24 Drawing Figures

ACOUSTIC LOG

This is a continuation, of application Ser. No. 473,726, filed May 28, 1974.

The present invention relates to a device for measuring the velocity of a ship relative to a reference by means of acoustic signals that are transmitted and received by transmitters and receivers arranged on board the ship. Apparatus is provided to form the signals transmitted from the ship and reflected by the reference into pairs of signals that are similar in character but differ in time, the time difference being dependent on the distance in the direction of measurement between the receivers and on the ship's velocity the said signals being compared and utilized in indication devices to generate a signal that depends upon the time difference between the two original signals.

A known method of measuring the velocity of a ship relative to the ocean floor by means of sound waves in the water is based on the Doppler effect. This method utilizes two or more beams of sound that are directed towards the bottom, the direction of the sound beams relative to the ship's direction of motion determining the ccalibration. It is also improtant that the lobe angle f the sound beam is narrow in order that an accurate measurement will be achieved. To produce a narrow lobe angle the dimensions of the acoustic transmitter and receiver transducers have to be large in comparison with the wavelength. The calibration of the Doppler log also depends upon the transmitter frequency and the sound velocity in the water.

Another known method of measuring the relative motion of an object, for instance that of a web of paper, can be seen from Swed. Pat. No. 329,735.

It is the main object of the present invention to accomplish a very accurate measurement of speeds without resorting to a narrow lobe angle and independent of the transmitter frequency and sound velocity. The use of lobe angles of a considerable size enables small acoustic transducers to be used, which offers great advantages from an assembly point of view, or lower transmitter frequencies, which is of advantage with respect to transmitter range.

SUMMARY OF THE INVENTION and related object are attained in accordance with the invention by means of apparatus which comprises a transmitter generating a coherent signal that is transmitted within a lobe space that is common to two receiving transducers, each of which may be connected to a separate receiver, which implies that the signals reflected by the reference object and received by the receivers will be composed of reflections from each point on the reference within the common lobe space and that the resulting signal will have an amplitude and a phase angle that are determined by the reflections from the entire lobe space each of the two signals received being representative of the instantaneous position of each receiving transducers relative to the reference, the signals being modulated owing to the vessel's moving relative to the reference.

To enable the speedometer to operate against the ocean floor even at considerable depths it is advisable to introduce a suppression function to eliminate echos originating from the mass of water between the vessel and the bottom. To optimize this suppression function the apparatus should be combined with a depth finder. According to one design of the invention one or both of the incoming signals can be fed to an electronic unit, operating in parallel with the depth-finder electronics. Being capable of operating, as distinguished from the Doppler deivce, at a relatively low frequency and thereby attaining a good depth range, the apparatus according to the invention offers particular possibilities of combining the speedometer function with an excellent depth-finding function. In addition, the apparatus according to the invention operates with a lobe whose main direction is vertical as distinguished from the oblique transmission lobes of the Doppler apparatus.

According to one design of the invention the apparatus may form part of a system for measuring the velocity of a ship, two or three pairs of receivers being connected each to a group of at least two receiver transducers in order that the velocity components within an area of a certain direction of travel can be measured.

The velocity measuring apparatus according to the invention can also form part of a system in which transducers elements fitted with switches can be combined into receiver transducers with different directions of measurement for measuring the longitudinal and transverse velocity components of a ship.

BRIEF DESCIRPTION OF THE DRAWINGS

A number of designs of the invention, which re selected as examples, will be described in below, reference being made to the drawings in the appended figures, of which

DETAILED DESCRIPTION

Figure 1:
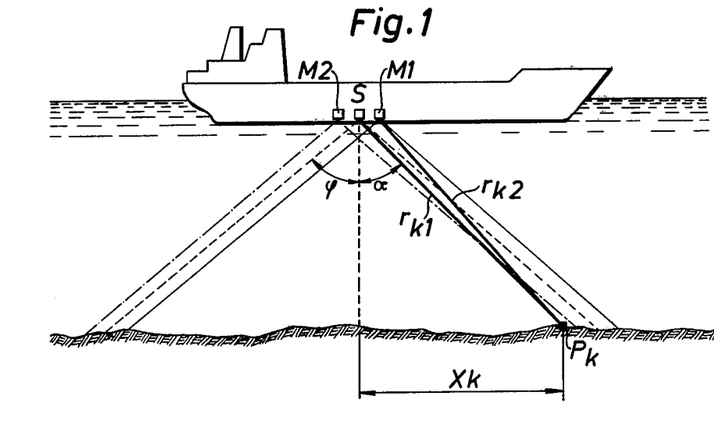
FIG. 1 shows the use of the velocity measuring apparatus on board a ship.

FIG. 1 illustrates the use of the invention on board a ship. An acoustic transmitter transducers S and two receiver antennas M1 and M2 are fitted in the ship's bottom plating. The transmitter and receiver transducers are shown on a larger scale in FIG. 2, which also shows that the three units arelined up one after the other, the two receiver elements in front of and behind the transmitter element and at a distance L between each receiver element and the transmitter element.

Considering a signal component passing from the transmitter to a point $P_k$ on the ocean floor and then, following reflection, returning to one of the receivers, say M1, its total discharge of travel is $$r_{k1} + r_{k2} \approx 2 \cdot \frac{X_k - \frac{L}{2}}{\sin \alpha}$$

The phase angle of the signal thus reflected from point $P_k$ when arriving at the receiver M1 will lag behind the transmitted signal by $$\phi_{k1} = \frac{2\pi}{\lambda} \cdot 2 \cdot \frac{X_k - \frac{L}{2}}{\sin \alpha}$$

where $\lambda$ denotes the wavelength of the transmitted signal in water. The over-all signal received by M1 is composed of reflections from a great number of points on the ocean floor within the transmitter — receiver lobe, each producing a signal as described above. The phase angles of the various components of the over-all angle have different values, depending upon the distance to the point of reflection of each one. The over-all signal thus has an amplitude that depends upon the reflections from the entire area within the lobe. A certain transmitter frequency and amplitude in conjunction with a certan transmitter — receiver position thus always results in a certain amplitude of the received signal. This applies also if the transmitter and receiver are interchanged since the over-all distance transmitter — point of reflection — receiver remains unchanged for each point of reflection even if the transmitter and the receiver are interchanged. This implies that when the vessel has moved over the distance L, the pair M2 — S has moved to the positions previously held by S — M1, and the signal received by M2 is identical with that previously received by M1.

It is possible to gain an idea of how fast the signal in the receivers varies as the ship moves, i.e., the spectral width of the signal modulation, by again considering the phase angle of the signal component reflected by poit $P_k$:

$$\phi_k = \frac{2\pi}{\lambda} \cdot 2 \cdot \frac{X_k - \frac{L}{2}}{\sin \alpha}$$

Differentiating this expression with respect to X and paying due attention to the fact that $\alpha$ depends upon $X_k$ we have $$\frac{d\phi_k}{dX} = \frac{2\pi}{\lambda} \cdot 2 \sin \alpha$$

This implies that $\phi_k$ will pass through $2\pi$ radians, i.e., one rotation, when $X_k$ changes by the amount $$\lambda \cdot \frac{1}{2 \sin \alpha}$$

Figure 3:
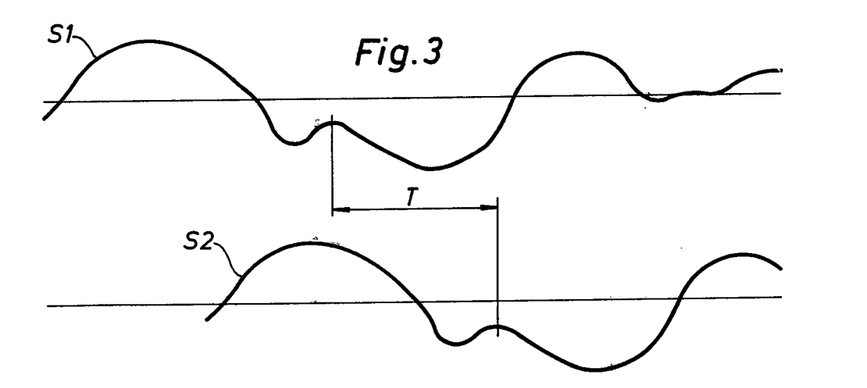
FIG. 3 shows examples of the shape of the two stochastic signals.

Combining all signal components within the lobe space for transmitter and receiver transducers a signal is obtained that has an amplitude modulation over the path, with a modulation spectrum that extends to frequencies corresponding to the wavelength $$\lambda \cdot \frac{1}{2 \sin \phi}$$

where $\phi$ is one-half of the lobe angle. The modulation is stochastic and may have a shape for instance as suggested in FIG. 3. It should be noted that the width of the modulation spectrum, i.e., the resolution in the signal is independent of the distance to the bottom. This is of great importance with regard to the usefulness of this measuring method over a long depth range.

According to the explanation given above, the signal in the second receiver will be identical with that in the first receiver, yet with a time lag amounting to T = L/v. This is illustrated in FIG. 3 by means of the two signals S1 and S2, which originate from M1 and M2, respectively.

In the explanation given above, the transmitter transducer is assumed to be situated halfway between the two receiver transducers. A displacement of the transmitter transducer to any other position along the direction of measurement, i.e., the straight line that connects the two receiver transducers, will result in a lack of symmetry in the signals arriving at the two receivers. At a small displacement of the transmitter transducer however, only a minor asymmetry occurs. This makes it possible, according to FIG. 4, to utilize one of the receiver transducers as a transmitter transducer, provided that the transmission is intermittent, the transducer element being switched over alternately between the transmitter and the receiver.

Figures 4, 5:
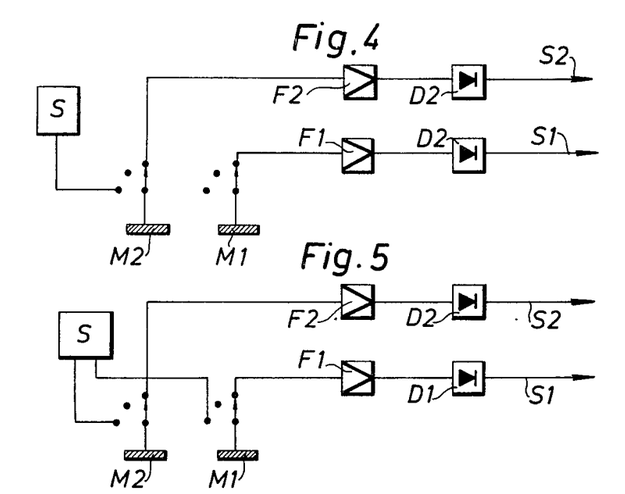
FIGS. 4 and 5 show two alternative change-over functions between the transmitter and the receivers.
Figure 6:
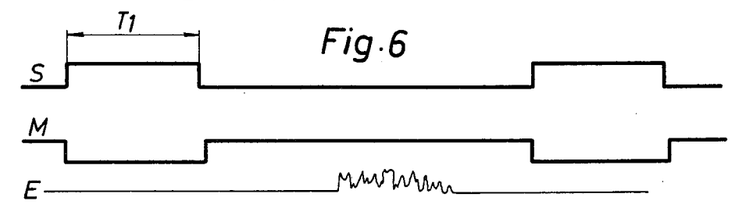
FIGS. 6, 7 and 8 show how transmitted and received pulses may be distributed in time at different change-over frequencies between the transmitter and the receivers.

From FIG. 5 it can be seen that it is also possible to transmit with both transducer elements in conjunction after which a change-over is made for reception by each transducer element individually. In this case the transmission lobe will be narrower than the reception lobe, and the frequency spectrum of the modulation of the receiver signals will be limited by the transmission lobe. FIG. 6 shows a diagram of how transmission and reception may be distributed with respect to time. The transmission pulse S here is comparatively long (for example $T_1 = 100$ ms). During this period of time the transducer is connected to the transmitter. The antenna is then switched over to the receiver, curve M illustrating the gate signal of the receiver. Curve E shows the echo signal.

The amplification in the receiver amplifiers may be provided with a control device that compensates for the dependence of the receiver signals on the distance to the ocean floor. It is also possible to provide the amplifiers with gate functions in addition to the switching of the connection to the transducer as shown here, for intance for the purpose of eliminating the bottom echo and measuring against amass of water at a selected distance from the vessel.

Figure 7:
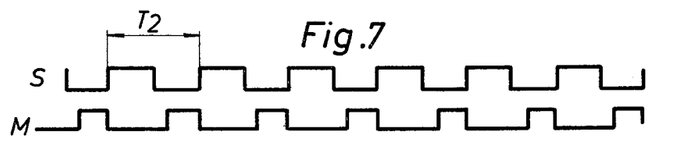

FIG. 7 offers an example of another sequence for switching over between transmitter and receiver. Here the switch interval has been made very short, for instance 1 ms. As far as the velocity-dependent modulation is concerned the receiver signals may be considered as continuous, yet it is possible to utilize the same transducer elements for transmission as well as reception.

In transmitter — receiver switching according to FIG. 6 there is a functional limitation at small depths in that the echo reflected by the bottom will return in part before the transmitter pulse is complete. This makes the useful portion of the bottom echo diminish gradually as the depth becomes less; in the end it will be shorter than the time lag between the two receiver signals T = L/v. This will lead to difficulties in measuring the time lag. When applying a continuous signal or pulsing according to the diagram in FIG. 7 there is no such limitation but here the depth range is restricted instead, owing to echoes from non-homogeneous portions of the mass of water at long distances to the bottom "drowning" the bottom echo.

Figure 8:
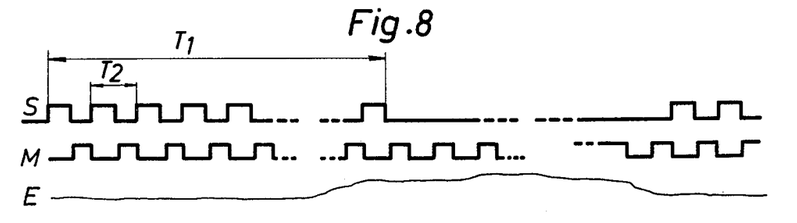

FIG. 8 illustrates one way of pulsing, which implies that the above-mentioned limitations of the pulsing according to FIGS. 6 and 7 can be overcome. In principle, pulsing elements are obtained here by multiplying the pulsing diagrams for the transmitter in accordance with FIGS. 6 and 7 by each other, causing the transmitter to send bursts of pulses during the period of time, T1. The receiver is connected to the transducer between the short transmitter pulses and also during the times between the pulse bursts by the transmitter. This makes it possible to receive signals in the receiver even during the time T1 and at shallow depths.

Figure 2:
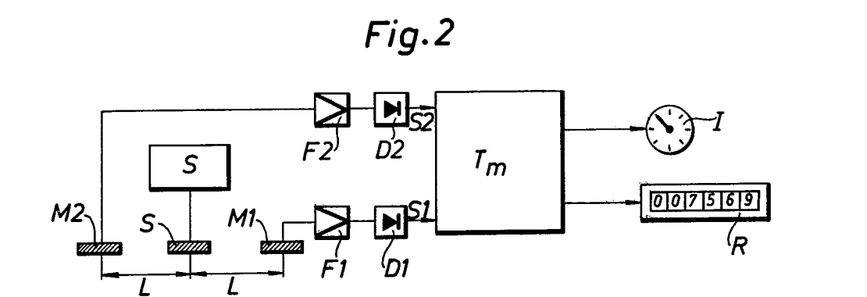
FIG. 2 shows a block diagram of a velocity measuring apparatus according to the invention.

FIG. 2 shows a block diagram of how the signals from the receiver transducers are amplified in the EF amplifiers F1 and F2, respectively, and how the amplitude envelope is detected by the detectors D1 and D2, respectively, after which the $T_m$ unit, comparing the signals S1 and S2, determines the velocity and produces output signals that may be sent for instance to a speed indicator I and a distance indicator D. The output signals may consist, for instance, of a voltage or current that is proportional to the velocity as concerns the speed indicator and of a pulse sequence the frequency of which is proportional to the velocity as concerns the distance indicator R, which in this case may comprise a pulse counter.

The $T_m$ unit may be, for instance, of the type described in Swed. Pat. 348,055, which produces output signals in conformity with the example given above and also maintains the signal in the periods of time between the long pulses as shown in FIGS. 6 and 8. A $T_m$ unit is illustrated in FIG. 23 and is described below.

Figure 23:
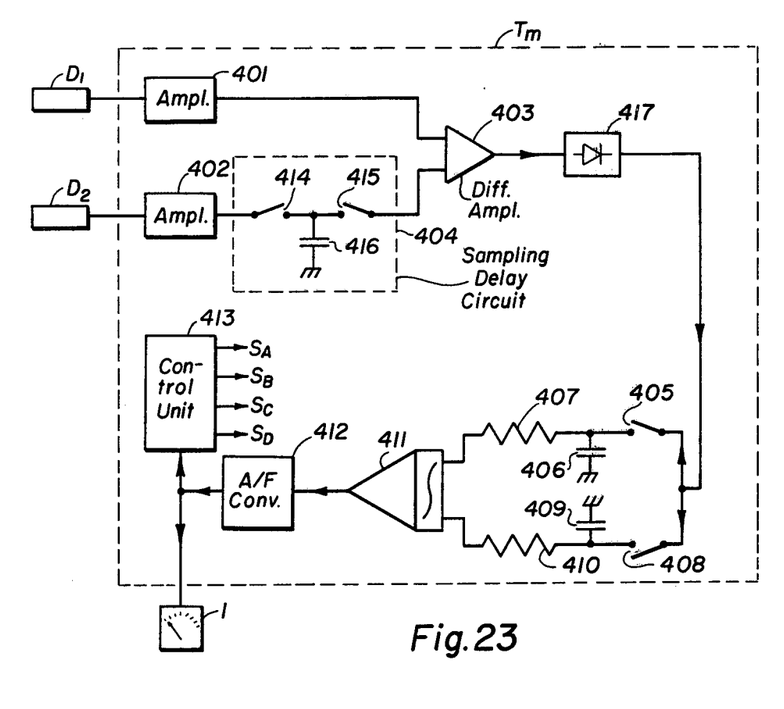
FIG. 23 shows a portion of FIG. 2 in greater detail.

Referring to FIG. 23, the detector D1 is directly connected via an amplifier 401 to a first input of a differential amplifier 403, while the detector D2 is connected via an amplifier 402 and a sampling delay circuit 404 to another input of the differential amplifier 403. The sampling delay circuit 404 comprises switches 414, 415 connected to a grounded capacitor 416. The output of differential amplifier 403 is connected via a comparing circuit 417 to two parallelly coupled branches of the circuitry. One of the circuit branches comprises a coupling switch 405, a grounded capacitor 406 and a resistor 407, while the other branch includes a coupling switch 408, a capacitor 409 and a resistor 410. The two branches are connected on the output of either of them to an integrating circuit 411 whose output is conected via an analog-frequency converter 412, on the one hand, to an indicating unit 1, and, on the other hand, to a control unit 412 arranged to control, by pulses, the switches 405, 408, 414 and 415 (switching on and off) in a manner such that the signal arriving from the other detector D2 is electronically time shifted Te coinciding with the time shifting Tm between the detectors D1 and D2.

When the object moves with a certain constant speed V, there originates a balancing condition resulting in a certain frequency f on the output of the analog-frequency converter 412. This frequency is fed to the indicating unti 1 which is calibrated to directly show the speed v. The frequency signals also are supplied to the control circuit 413 which, in the otherwise known mode, is arranged to issue pulse series with relatively certain pulse repetition frequencies, pulse spacing, pulse length and delay. In relation to the frequencies f, as shown in FIG. 23, there are four outputs $S_A$, $S_B$, $S_C$, $S_D$. These outputs are adapted to actuate the respective switches 414, 415, 405 and 408, which switches naturally need not be conventional contact means, but can comprise transistors or may be selected or arranged in another manner. The normal direction of travel of a ship is indicated by its longitudinal axis. Under the influence of sea currents and winds, however, it may often move over shoals and banks along a line that deviates slightly from the said axis. If the angle between the direction of travel over shoals, etc., and the longitudinal ship's axis is denoted δ, the velocity over shoals, etc., is denoted δ, the velocity component over shoals, etc., in the longitudinal direction $v_x$ and the velocity component over shoals, etcl, in the transverse direction $v_y$, then the following relations apply:

$$v_x = v \text{ ocs } \delta; \ v_y = v \sin \delta.$$

A log for navigation purposes is expected primarily to provide information about the longitudinal velocity component $v_x$ but it is desired also to obtain information concerning the transverse velocity component $x_y$ to be able to follow the ship's movements across shoals, banks, etc. It will be demonstrated here how the longitudinal velocity component $v_x$ can be obtained directly from apparatus according to the invention by designing the receiver brand transducers in an adequate manner. Further, a few methods of obtaining also the transverse velocity component $v_y$ will be shown.

Figure 11:
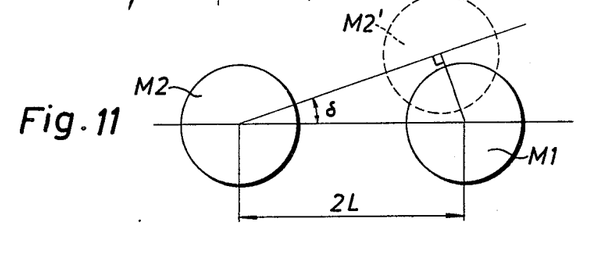
FIG. 11 shows two circular receiver transducers at a mutual distance of 2L, with a imaginary displacement of one of the receivers.

One way of designing the receiver transducers that is near at hand is illustrated by FIG. 11. The receiver transducers in this case consist of circular elements arranged at a distance of 21. The transmitter transducer is intended to be installed halfway between the receiver transducers but has been omitted in the drawing.

The processing of signals in accordance with Swed. Pat. No. 348,055 implies that the signal from the receiver transducer W1 is stored and compared with the signal from the receiver transducer W2, following a time lag. In the course of this time lag the receiver antanna W2 moves along a line forming the angle δ with the straight line that connects the two receiver transducers.

Figure 14:
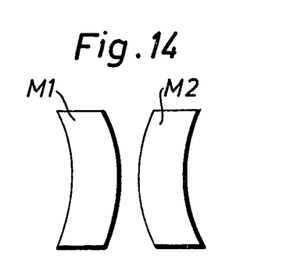
FIG. 14 shows a special design of the sensor elements where the demand for accuracy is particularly stringent.

The time-lag meter $T_m$ will adjust itself to the time lag that establishes maximum correlation between the two signals, which implies maximum overlapping of the surfaces shown in FIG. 14. This occurs when the center distance between M1 and the displaced receiver M2 (= M2) is minimum. At this moment M2 has been displaced by as much as 2M · cos δ relative to the signal pattern. The correlator than indicates a velocity that corresponds to the time lag $$\tau_i = \frac{L \cos \delta}{v}$$

The indicated velocity $$v_i = \frac{v}{\cos \delta}$$

instead of the correct value. $v_x = v \cdot \cos \delta$.

This configuration of the transducers thus results in a false velocity indication in case of drift. It can be used, however, where the demand for accuracy is moderate as in cases when the drift angles may be expected to be comparatively small.

Figure 12:
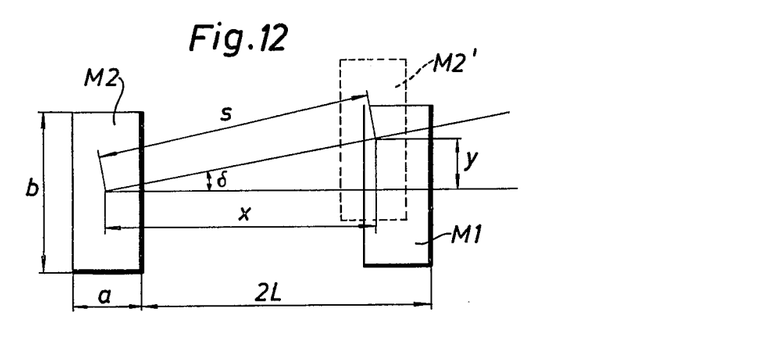
FIG. 12 shows two rectangular receiver transducers.

In FIG. 12 the receiver transducers are assumed to be rectangular. Under practical conditions the area of sensitivity of the receivers reaches somewhat outside the geometrical surfaces of the receiver transducers. To simplify the calculation it will be carried out here as if the sensitivity area of the receivers does coincide with the geometrical shape of the receiver transducers.

At a displacement s in a direction forming an angle δ with the straight line between the centers of the receiver transducers there will be an overlapping of the surfaces:

$$\bar{0} = (a - |2L - x|)(b - |y|) = (a - |2L - x|)(b - x|\tan \delta|) =$$
$$= (a - |2L - s \cos \delta|)(b - s|\sin \delta|)$$

for $2L - a < x < 2L + a - b < y < b$

Figure 13A:
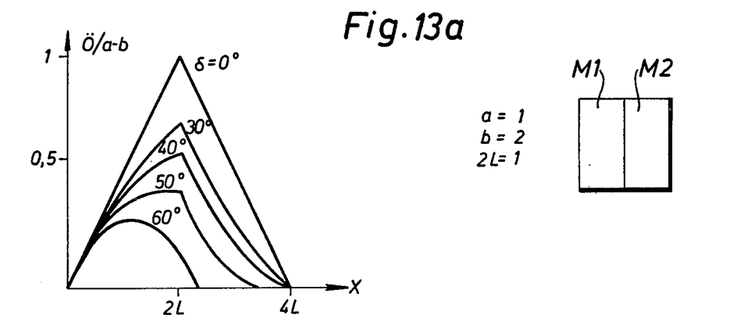
FIGS. 13a and 13b show the function Ö for two dimensions of the sensor.
Figure 13B:
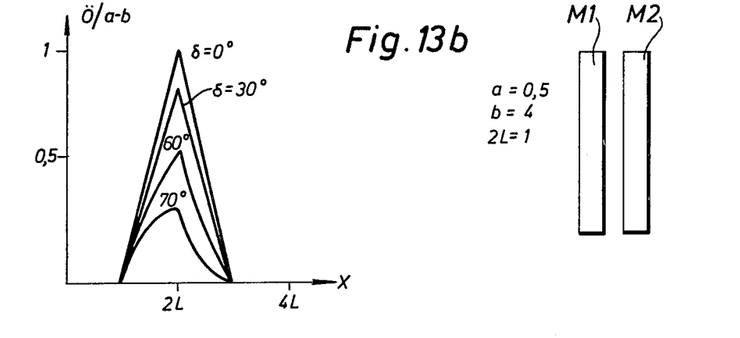

The function $\bar{0}$ is shown for two dimensions of the sensor in FIG. 13 a and b.

As will be seen from FIG. 13a, $\bar{0}$ has its maximum at a displacement s, which when projected on the x axis equals the receiver transducer distance of 2L at small δ value. This implies that the velocity projected on the x axis is measured, i.e., $v_x = v \cos \delta$. At increasing values of δ the overlapping function Q will show an increasing asymmetry, which may cause errors when measuring $v_x$. The size of the error not only depends on δ but also on the sensor dimensions and on details in the time-lag meter. From FIG. 13a it may, however, be concluded that these should cause no problem in attaining an acceptable function at angles up to 30°. At still bigger angles, particular attention has to be paid to the dimensioning. If, for example, the dimension b is made to be 4 times as big as the dimension 2L a correct measurement of $v_x$ can be made in the angular range ± 60° (FIG. 13b). A minor error may, however, occur in the lateral parts of the angular range, owing to the design of the time-lag meter. Where the accuracy has to be particularly great (of the order of a few per mill) the measuring error of the time-lag meter in determining the position of the maximum of an asymmetric overlapping function can be compensated for by a special design of the receiver tranducers.

The error affecting the determination of $v_x$ at big δ values is, according to FIG. 13, such as to take the indication of the correlation maximum correspond to a shorter base of measurement L than the actual one. Hence this error can be compensated for by giving the receiver transducers a slight curvature transverse to the direction of measurement. This is illustrated in FIG. 14 where the curvature of the receiver transducers is stongly exaggerated to become easily visible in the figure.

Figure 9:
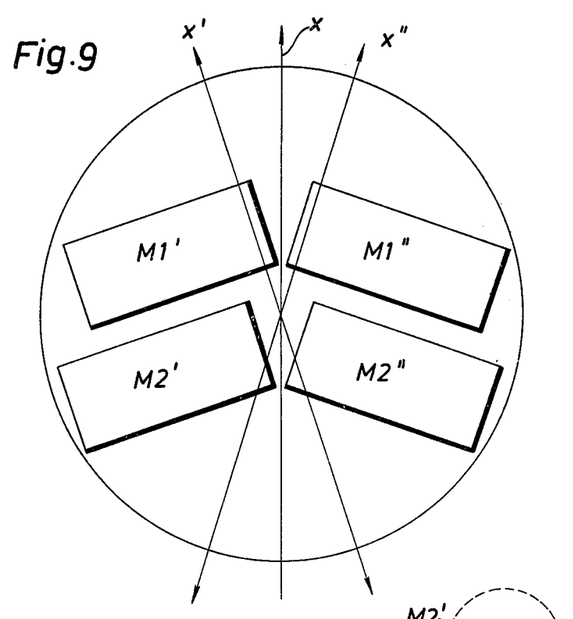
FIG. 9 shows a unit with pairs of receiver transducers arranged at angles.
Figure 10:
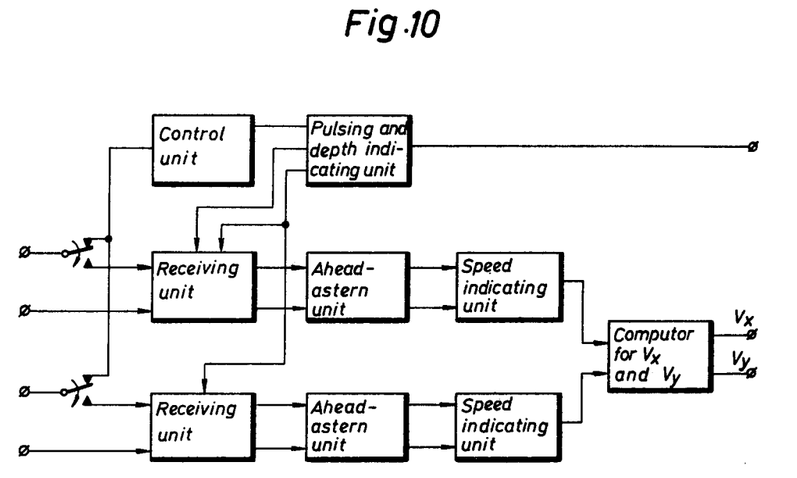
FIG. 10 shows a block diagram of the processing of the signals from the receiver transducers according to FIG. 9.

FIG. 9 shows how 4 receiver transducers may be arranged to provide two directions of measurement, X' and X'' on each side in the longitudinal direction of the vessel. For directions of travel deviating within approx. a ± 20° range from the longitudinal direction of the vessel direct measurements of the velocity components can be made in the two directions, X' and X'', from which the correct values of $v_x$ and $v_y$ may then be calculated. FIG. 10 shows a block diagram for the processing of the signals in the case mentioned. The signals, representing values of $v_x$ and $v_y$, can then be corrected to a display and/or a navigation system, comprising for instance a plotter for continuous plotting of the position directly on to the chart.

Figure 17:
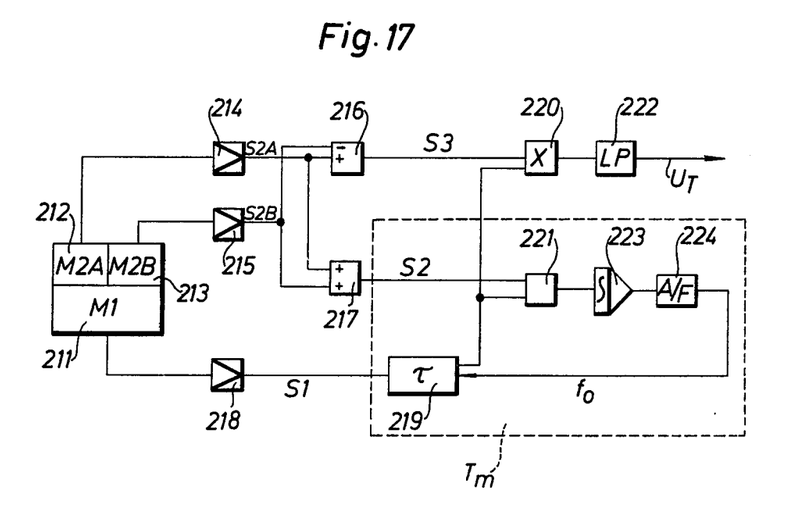
FIG. 17 shows a sensor with a split transducer element and a block diagram of an apparatus comprising the sensor.

Another method of determining the velocity components in the longitudinal ($v_x$) and transverse ($v_y$) directions at moderate values of the angle δ, is shown in FIG. 17. As mentioned previously there are, in principle, two receiver transducers M1 and M2, but M2 is divided into two equal parts, M2A and M2B, across the main measuring direction.

For measuring the velocity component in the measuring direction the signals from the two transducer parts M2A and M2B are added in the adder 217, yielding the signal S2. S2 is equivalent to the signal that would have been obtained from the split transducer, had it not been split. Units 219, 221, 223, and 224 effect the velocity determination similar to the embodiment described with reference to FIGS. 2 and 23, the time-lag unit τ being set in such a way that the electric delay in the τ unit will equal the time lag between the signals S1 and S2, following from the ship's velocity component $v_x$ in the direction of measurement.

Figure 18:
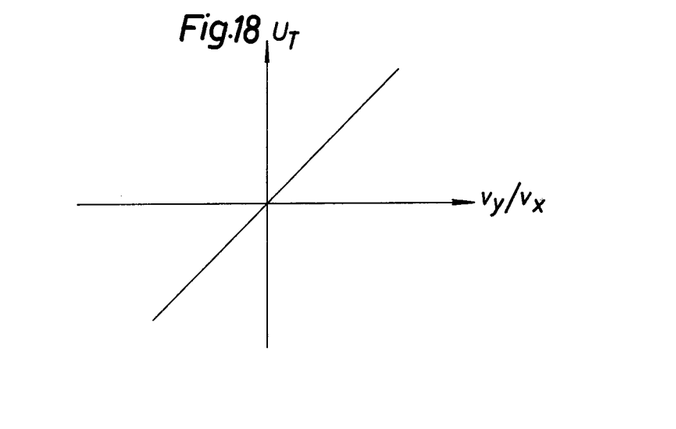
FIG. 18 shows the output voltage $U_T$ as a function of the direction of travel.

The unit 216 produces the difference between the signals from the transducer parts 212 and 213. The signal thus obtained, S3, is multiplied by the delayed signal S1(t-t) in the unit 220. The low-pass filter LP (222) mainly filters out the DC voltage component from the signal product obtained, and an output voltage $U_T$ is established. $U_T$ becomes a function of the direction of travel relative to the direction of measurement, for instance in accordance with FIG. 18 in which $v_x$ is the velocity component in the measuring direction and $v_y$ constitutes the velocity component at right angles to that direction. This function may possibly be non-linear but can easily be linearized into a substantially straight line. This makes it very easy to utilize the voltage $U_T$ for determining the drift angle or, in conjunction with the signal for the velocity $v_x$, for determining $v_y$, and also for determining integrated drift over a desired period of time. The apparatus described thus offers a possibility of determining, for the purpose of navigation, the route of ships over shoals, banks, etc., even if the direction of travel should deviate slightly from the longitudinal axis of the vessel.

The origin of the function for $U_T$ according to FIG. 13 will now be analyzed.

The units 220 and 222 approximately form the cross-correlation function for the signals S1 and S3 at the point $\tau = L/v_x$ where L is the basis of measurement = one-half the distance in the direction of measurement between the transducer element 211 and the antenna elements 212 and 213, i.e., $$U_T = MV[S1(t - \tau)S3(t)] =$$

$$= \frac{1}{T} \int_t^{t+T} S1(t - \tau)S3(t)dt =$$

$$= \frac{1}{T} \int_t^{t+T} S1(t - \tau)[S2A(t) - S2B(t)]dt =$$

$$= \frac{1}{T} \int S1(t - \tau)S2A(t)dt - \frac{1}{T} \int S1(t - \tau)S2B(t)dt =$$

$$= U_{AT} - U_{BT}$$

$U_{AT}$ and $U_{BT}$ are approximately the cross-correlation function between S1 and S2A and between S1 and S2B, respectively, at point $\tau = L/v_x$. As for their mean values these two cross-correlation functions are equal, provided that $v_y = 0$, which follows from the symmetry of the transducer arrangement. However, if the direction of travel should deviate from the direction of measurement so that for instance part 213 of the transducer happens to fall somewhat outside the area of the utilized signal pattern that was previously covered by the receiver transducer 211 during a period of time equalling $\tau = L/v_x$, then $U_{BT} < < U_{AT}$, and $U_T$ will be positive. In the same manner $U_T$ will be negative, should the direction of travel deviate from the direction of measurement in the opposite way. The greater deviation of the direction of travel in relation to the direction of measurement, the greater the amplitude of $U_T$. The linearity of $U_T$ is attributable to characteristic properties of the multiplication unit 220.

Figure 15:
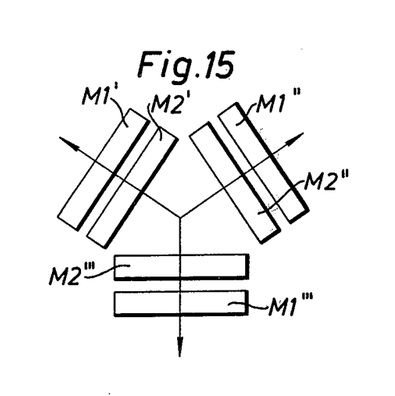
FIG. 15 shows a sensor arrangement for measuring velocity components in any arbitrary direction of travel.

In certain cases, such as docking maneuvers, it is important to be able to measure directions of travel that form an arbitrary angle with the ship's longitudinal axos. This can be done by means of apparatus comprising a log according to the present invention, by arranging three pairs of receiver transducers with their directions of measurement 120° apart, in accordance with FIG. 15. If each pair of transducers is dimensioned to be used in velocity measurement within an angular interval of approximately ± 60° outside its measuring direction the velocity vector will always remain within the measuring range of at least two pairs of transducers and two velocity components will be obtained. Hence it will always be possible to calculate the components $v_x$ and $v_y$ from the velocity measurements effected by these pairs of receivers.

Figure 19:
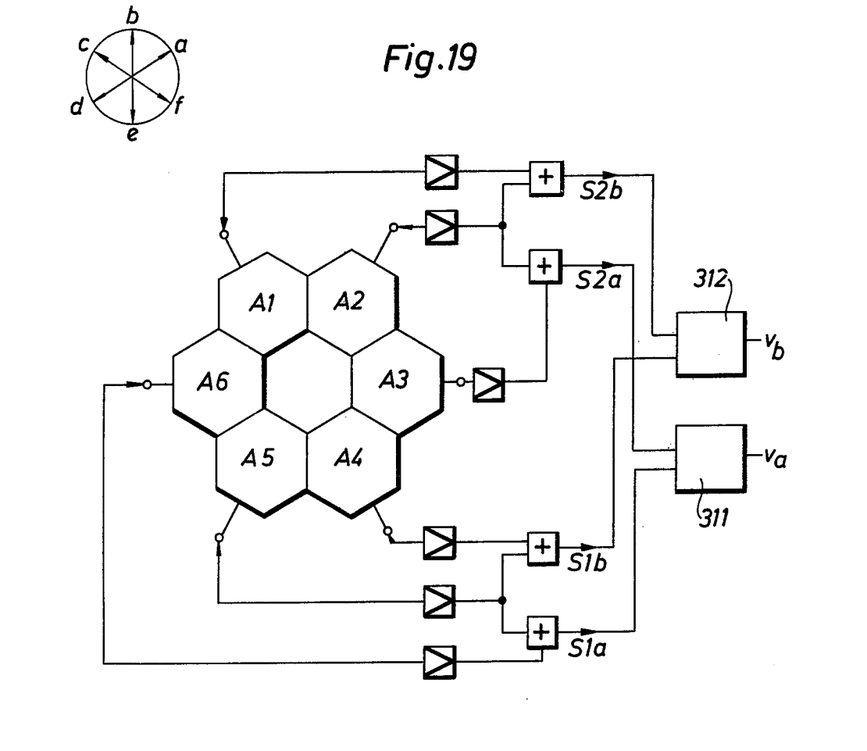
FIG. 19 shows a sensor with a number of hexagonal transducer elements together with a block diagram of an apparatus comprising the sensor.

FIG. 19 shows one way of constructing an transducer from a number of elements that can be switched over from one velocity measuring device to another, according to the invention, to yield the velocity along an arbitrary direction of travel. By using 6 circular or possibly hexagonal elements arranged according to FIG. 19, 6 measuring directions are obtained, the two receiver transducers for each direction of travel consisting of two elements each. The change-over between the transducer elements is controlled in such a way that the direction of travel concerned is embraced by two adjacent directions of measurement. By using two speedometer units 311 and 312 the velocity components $v_a$ and $v_b$ along the connected directions of measurement can then be determined, enabling the true direction of travel to be calculated.

The arrangement of transducers as described can also be used in conjunction with a system according to FIG. 17. The signals from the two tranducers situated foremost in the direction of travel are added, yielding S1 (e.g., transducers A1 and A2 in FIG. 17). S2A and S2B are obtained from the tranducers A4 and A5, respectively, in this case.

Figure 16:
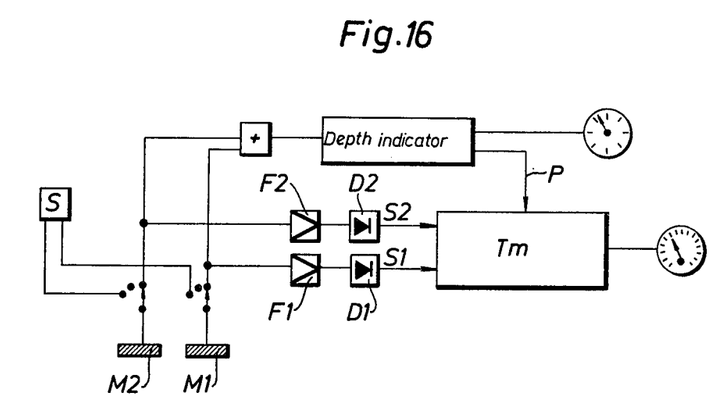
FIG. 16 shows a block diagram of a velocity measuring apparatus according to the invention, including depth-finding electronics.

FIG. 16 shows how the sensor signals are used in depth measurements by means of an electronic unit, operating in parallel with the depth measurement electronics. One of the sensor signals is sufficient for the depth meausrement but by adding the signals from both sensors an improved signal-to-noise ratio and hence an improved distance range can be achieved. The depth measurement unit provides the depth indication signal and the digital signal P for controlling the gate signal of the speedometer for measurements against the bottom or a mass of water.

According to one design of the invention the velocity can be measured down to the value 0 on the part of the ship by means of two scanning devices provided that these are moving at a known velocity relative to the vessel. Such movement can be brought about by using a sensor comprising many stationary elements defining respective senging areas, two signal outputs being tapped by switches that connect the signal outputs to one sensor element after another in a sequence, enabling an effective movement of the sensing areas to be obtained.

Figure 20:
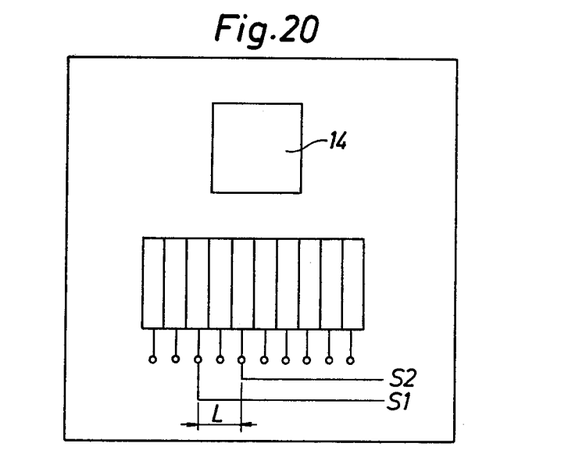
FIGS. 20 and 21 show an acoustic sensor with a number of scanning ranges.
Figure 21:
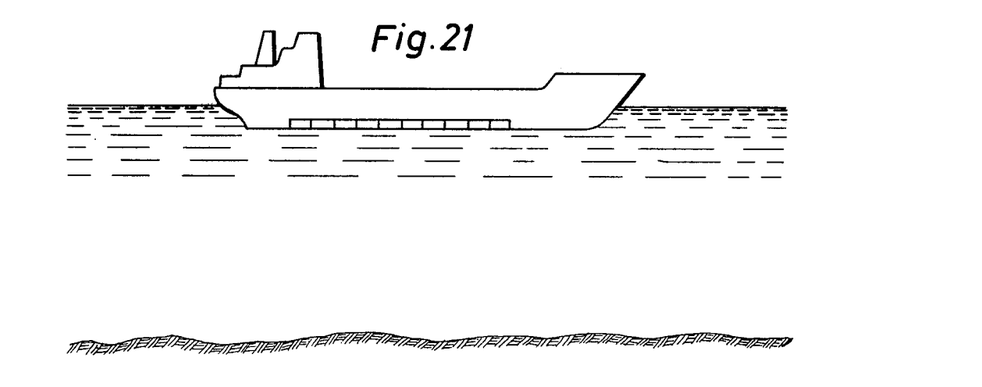

FIG. 20 shows a horizontal projection of an acoustic sensor as described whereas FIG. 21 is a schematic drawing of its installation aboard a ship. The size of the sensor is exaggerated as compard with the size of the ship. In reality, the size of the sensor is only a few decimeters or less whereas the length of the ship may be anything up to almost 200 m. The acoustic sensor comprises a transmitter element 14 and a number of receiver elements (10 of which are illustrated in FIG. 21).

In FIGS. 20 and 21 two signals, S1 and S2, are tapped by two selector switch arms Sw1 and Sw2, respectively, which move along the sensor field at a velocity $v_o$. The distance between the selector arms is D. When the velocity of the object $v = 0$ the two signals S1 and S2 assume a time lag of $\tau_o = L/v_o$ in relation to each other, owing to the scanning by the switches Sw1 and Sw2, respectively. If the object is moving, the time lag obtained depends on the over-all velocity $$\tau = \frac{L}{2v + v_o}$$

Figure 22:
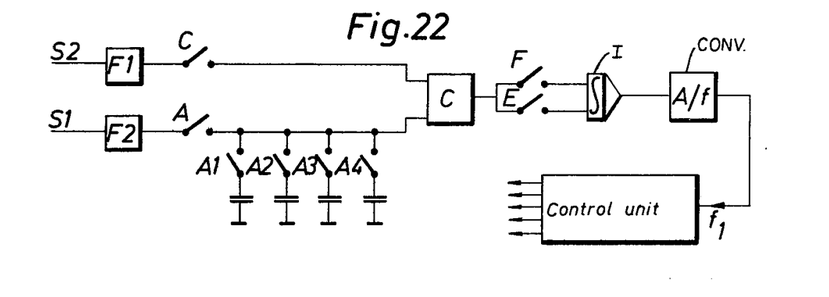
FIG. 22 shows a circuit for measuring the time lag between two sensors according to FIGS. 20 and 21.

The signal processing for determining $v$ may be carried out, for instance, as suggested in FIG. 22. F1 and F2 are filters that eliminate the sampling effect in the signals from Sw1 and Sw2, respectively, so that continuous signals are again generated. The functions of the switches A, C, A1, A2, A3, A4, E, F, the blocks C, I, A/F, and the Control unit, are similar to the function of similar corresponding elements shown in FIG. 23 and discussed hereinabove. An output signal consisting of pulses the frequency of which is proportional to the velocity, is obtained by combining the signal $f_1$ from the circuit according to FIG. 22 with the pilot frequency $f_2$ for the scanning switches of the sensor, the velocity $v$ of the measured object being $$v = L\frac{f_1}{k_1} - \frac{f_2}{k_2} = k \cdot f$$

The generation of $f$ from $f_1$ and $f_2$ above, can be effected by means of a number of known digital circuits.

We claim:

1. Apparatus for measuring a vessel's velocity relative to a reference location, comprising:

transmitter means on board a vessel and including at least one transmitter and at least one transmitting transducer coupled to said at least one transmitter for transmitting a coherent signal toward the reference location from where the coherent signal is reflected;

receiver means on board the vessel and comprising at least two spaced-apart receiver transducers coupled to at least one receiver, said at least two spaced-apart receiver transducers having an elongated sensing area having a predetermined longitudinal curvature, and being oriented such that the long sides of said sensing area are substantially at right angles to the direction of velocity measurement;

said coherent signal transmitted by said transmitter means being within a lobe range that is substantially common to said at least two spaced-apart receiver transducers, the signals reflected by said reference location and received by said receiver means comprising at least two acoustic signals that are similar in character but different in timing from each other, the difference in timing between said at least two acoustic signals being a function of the distance in the direction of measurement between said spaced-apart receiver transducers and further being a function of the vessel's velocity, said received signals comprising reflections from every point on the reference location within said lobe range;

each of said reflected acoustic signals received by said receiver means being representative of the instantaneous position of each of said receiver transducers relative to said reference location, said received signals being modulated as a function of the vessel's movement relative to said reference location; and operating means coupled to said receiver means for comparing said reflected acoustic signals with each other and for generating an output signal which is a function of the timing difference between said two signals, said output signal further being indicative of the vessel's velocity relative to the reference location.

2. Apparatus for measuring a vessel's velocity relative to a reference location, comprising:

transmitter means on board a vessel and including at least one transmitter and at least one transmitting transducer coupled to said at least one transmitter for transmitting a coherent signal toward the reference location from where the coherent signal is reflected;

receiver means on board the vessel and comprising at least four spaced-apart receiver transducers coupled to at least one receiver, said at least four spaced-apart receiver transducers all being stationary relative to the vessel and each having an elongated sensing area and being arranged in pairs beside each other, the transducers of each pair being situated such that the direction of measurement of one pair is oriented at a predetermined angle relative to the direction of velocity measurement of the other pair, the longitudinal axis of the vessel being substantially parallel to the binsectrix of the angle between said two directions of velocity measurement so that two velocity components of the vessel's velocity can be determined when there is a certain angle between the direction of travel of the vessel and its longitudinal axis;

said coherent signal transmitted by said transmitter means being within a lobe range that is substantially common to said at least four spaced-apart stationary receiver transducers, the signals reflected by said reference location and received by said receiver means comprising at least two acoustic signals that are similar in character but different in timing from each other, the difference in timing between said at least two acoustic signals being a function of the distance in the direction of measurement between said spaced-apart stationary receiver transducers and further being a function of the vessel's velocity, said received signals comprising reflections from every point on the reference location within said lobe range;

each of said reflected acoustic signals received by said receiver means being representative of the instantaneous position of each of said stationary receiver transducers relative to said reference location, said received signals being modulated as a function of the vessel's movement relative to said reference location; and operating means coupled to said receiver means for comparing said reflected acoustic signals with each other and for generating an output signal which is a function of the timing difference between said two signals, said output signal further being indicative of the vessel's velocity relative to the reference location.

3. Apparatus according to claim 2, wherein said receiver means includes six of said spaced-apart receiver transducers arranged in pairs and providing three directions of measurement, the pairs of transducers being oriented relative to each other such that the directions of measurement form angles of approximately 120° with each other, thereby enabling the velocity components of any arbitrary direction of travel to be measured.

4. Apparatus for measuring a vessel's velocity relative to a reference location, comprising:

transmitter means on board a vessel and including at least one transmitter and at least one transmitting transducer coupled to said at least one transmitter for transmitting a coherent signal toward the reference location from where the coherent signal is reflected;

receiver means on board the vessel and comprising a plurality of receivers and a plurality of receiver transducers arranged in an array, said receiver transducers being stationary relative to the vessel, at least some of said stationary receiver transducers being spaced-apart, pairs of said spaced-apart ones of said stationary receiver transducers forming a unit comprising a number of pairs of receiver transducers, alternate paired combinations of said receiver transducers being oriented and connected to respective receivers to provide various directions of velocity measurement so that two velocity components of the vessel's velocity can be determined when there is a certain angle between the direction of travel of the vessel and its longitudinal axis;

said coherent signal transmitted by said transmitter means being within a lobe range that is substantially common to said spaced-apart receiver transducers, the signals reflected by said reference location and received by said receiver means comprising at least two acoustic signals that are similar in character but different in timing from each other, the difference in timing between said at least two acoustic signals being a function of the distance in the direction of measurement between said spaced-apart stationary receiver transducers and further being a function of the vessel's velocity, said received signals comprising reflections from every point on the reference location within said lobe range;

each of said reflected acoustic signals received by said receiver means being representative of the instantaneous position of each of said stationary receiver transducers relative to said reference location, said received signals being modulated as a function of the vessel's movement relative to said reference location; and operating means coupled to said receiver means and being responsive to the outputs of said receivers for comparing said reflected acoustic signals with each other and for generating an output signal which is a function of the timing difference between said two signals, said output signal further being indicative of the vessels velocity relative to the reference location, said operating means being further responsive to the receiver outputs to measure various direction components of the vessel's velocity.

5. Apparatus for measuring a vessel's velocity relative to a reference location, comprising:

transmitter means on board a vessel and including at least one transmitter and at least one transmitting transducer coupled to said at least one transmitter for transmitting a coherent signal toward the reference located from where the coherent signal is reflected;

receiver means on board the vessel and comprising six spaced-apart receiver transducers coupled to at least one receiver, said six spaced-apart receiver transducers each having an elongated sensing area and being arranged in pairs beside each other, the transducers of each pair being situated so as to provide three directions of velocity measurement, each pair being oriented at an angle of approximately 120° with the other pairs to enable velocity components of any arbitrary direction to be measured, the longitudinal axis of the vessel being substantially parallel to the bisectrix of the angle between said directions of velocity measurement;

said coherent signal transmitted by said transmitter means being within a lobe range that is substantially common to said six spaced-apart receiver transducers, the signals reflected by said reference location and received by said receiver means comprising at least two acoustic signals that are similar in character but different in timing from each other, the diffrence in timing between said at least two acoustic signals being a function of the distance in the direction of measurement between said spaced-apart receiver transducers and further being a function of the vessel's velocity, said received signals comprising reflections from every point on the reference location within said lobe range;

each of said reflected acoustic signals received by said receiver means being representative of th instantaneous position of each of said receiver transducers relative to said reference location, said received signals being modulated as a function of the vessel's movement relative to said reference location; and operating means coupled to said receiver means for comparing said reflected acoustic signals with each other and for generating an output signal which is a function of the timing difference between said two signals, said output signal further being indicative of the vessel's velocity relative to the reference location.

* * * * *